(12) United States Patent
Tang

(10) Patent No.: US 11,706,463 B2
(45) Date of Patent: Jul. 18, 2023

(54) VIDEO SYNTHESIS METHOD, APPARATUS, COMPUTER DEVICE AND READABLE STORAGE MEDIUM

(71) Applicant: BEIJING MICROLIVE VISION TECHNOLOGY CO., LTD, Beijing (CN)

(72) Inventor: Zhixin Tang, Beijing (CN)

(73) Assignee: BEIJING MICROLIVE VISION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/291,943

(22) PCT Filed: Oct. 24, 2019

(86) PCT No.: PCT/CN2019/113117
§ 371 (c)(1),
(2) Date: May 6, 2021

(87) PCT Pub. No.: WO2020/093879
PCT Pub. Date: May 14, 2020

(65) Prior Publication Data
US 2022/0007061 A1 Jan. 6, 2022

(30) Foreign Application Priority Data
Nov. 8, 2018 (CN) .......................... 201811326170.3

(51) Int. Cl.
*H04N 19/91* (2014.01)
*H04N 5/265* (2006.01)
*H04N 19/13* (2014.01)

(52) U.S. Cl.
CPC ............. *H04N 19/91* (2014.11); *H04N 5/265* (2013.01)

(58) Field of Classification Search
CPC .............................. H04N 19/91; H04N 5/265
(Continued)

(56) References Cited

U.S. PATENT DOCUMENTS 11,297,332 B1 * 4/2022 Walters ................. G06T 3/0012
11,361,778 B2 * 6/2022 Fuchs ....................... H04R 3/12
(Continued)

FOREIGN PATENT DOCUMENTS

CN        1520154 A     8/2004
CN     101316366 A     12/2008
(Continued)

OTHER PUBLICATIONS

Chinese Patent Application No. 201811326170.3, First Office Action dated Nov. 7, 2019, 7 pages.
(Continued)

*Primary Examiner* — Albert Kir

(57) ABSTRACT

The present disclosure provides a video synthesis method, apparatus, computer device and computer-readable storage medium, which the method includes: acquiring a first video; capturing second video data photographed in real time; performing first encoding on the second video data to obtain an encoded video; synthesizing the first video and the encoded video to obtain synthesized video data; and performing second encoding on the synthesized video data to obtain a target video. By means of the method, there is less loss in the obtained target video frames and a relatively high definition of the video frames.

11 Claims, 3 Drawing Sheets

(58) Field of Classification Search
USPC .................................................. 375/240.01
See application file for complete search history.

(56) References Cited

U.S. PATENT DOCUMENTS

| | | | |
|---|---|---|---|
| 2004/0036782 A1 | 2/2004 | Knapp | |
| 2004/0234145 A1* | 11/2004 | Yatabe | H04N 19/587 375/E7.181 |
| 2006/0017949 A1 | 1/2006 | Yada et al. | |
| 2012/0062759 A1 | 3/2012 | Nishi | |
| 2012/0213486 A1 | 8/2012 | Lee et al. | |
| 2014/0184850 A1 | 7/2014 | Raju et al. | |
| 2017/0163992 A1 | 6/2017 | Lu | |
| 2018/0098077 A1* | 4/2018 | Skupin | H04N 19/187 |
| 2018/0146234 A1 | 5/2018 | Kabuto et al. | |
| 2018/0240221 A1 | 8/2018 | Rijnders | |
| 2018/0330757 A1* | 11/2018 | Xiong | G11B 27/34 |
| 2018/0367808 A1* | 12/2018 | Zhou | H04N 19/127 |
| 2020/0036990 A1* | 1/2020 | Andersson | H04N 19/40 |
| 2020/0227089 A1* | 7/2020 | Xiao | G11B 27/34 |
| 2020/0396419 A1* | 12/2020 | Wang | G11B 27/031 |
| 2021/0105022 A1* | 4/2021 | Flynn | H03M 7/6011 |
| 2022/0007061 A1 | 1/2022 | Tang | |

FOREIGN PATENT DOCUMENTS

| | | |
|---|---|---|
| CN | 102238410 A | 11/2011 |
| CN | 105979267 A | 9/2016 |
| CN | 107295352 A | 10/2017 |
| CN | 108243318 A | 7/2018 |
| CN | 108769561 A | 11/2018 |
| CN | 109547711 A | 3/2019 |
| JP | 2002112269 A | 4/2002 |
| JP | 2004310881 A | 11/2004 |
| JP | 2006033755 A | 2/2006 |
| JP | 2008306394 A | 12/2008 |
| JP | 2013258532 A | 12/2013 |
| JP | 2014192557 A | 10/2014 |
| JP | 2015027055 A | 2/2015 |
| JP | 2015053741 A | 3/2015 |
| JP | 2016119594 A | 6/2016 |
| KR | 10-2005-0071822 | 7/2005 |
| KR | 10-2008-0043492 | 5/2008 |
| KR | 10-2017-0043324 | 4/2017 |

OTHER PUBLICATIONS

Chinese Patent Application No. 201811326170.3, Second Office Action dated Mar. 25, 2020, 7 pages.
Chinese Patent Application No. 201811326170.3, Third Office Action dated Jul. 8, 2020, 7 pages.
Chinese Patent Application No. 201811326170.3, Fourth Office Action dated Oct. 14, 2020, 5 pages.
Chinese Patent Application No. 201811326170.3, Final Rejection dated Feb. 19, 2021, 5 pages.
International Patent Application No. PCT/CN2019/113117, International Search Report and Written Opinion dated Jan. 2, 2020, 9 pages.
Examination Report dated Feb. 22, 2022 in Indian Patent Application No. 202127020738.
Notice of Reasons for Refusal dated Jun. 7, 2022 in Japanese Patent Application No. 2021-523609 (4 pages) with an English translation (4 pages).
Extended European Search Report dated Jun. 13, 2022 in European Patent Application 19881284.4.
Anonymous: "How to Duet on TikTok App: It Takes Two to Duet!", Sep. 24, 2018 (Sep. 24, 2018), pp. 1-35, XP055926941, Retrieved from the Internet: URL: https://dohack.info/sns/how-to-duet-on-tiktok-app [retrieved on Jun. 1, 2022].
Request for the Submission of an Opinion issued Sep. 13, 2022 in corresponding KR 10-2021-7012651 English Translation (13 pages).
Notice of Allowance dated Dec. 19, 2022 in corresponding JP Patent Application 2021-523609, English translation (5 pages).

* cited by examiner

VIDEO SYNTHESIS METHOD, APPARATUS, COMPUTER DEVICE AND READABLE STORAGE MEDIUM

CROSS-REFERENCE TO RELATED APPLICATION

The present disclosure claims the benefit of a Chinese patent application No. 201811326170.3 filed on Nov. 8, 2018 in the State Intellectual Property Office of China, the disclosure of which is incorporated by reference herein in its entirety.

Technical Field

The disclosure relates to the field of computer technologies, in particular to a video synthesis method, apparatus, computer device and readable storage medium.

Background Art

With the development of smart terminal technologies, people often use mobile phones, tablets and other smart terminals to photograph videos, in order to record their work and life moments. Generally, memories of smartphones, tablets and other smart terminals are limited, but with the increasing number of videos photographed, it is inevitable that desired videos cannot be saved due to insufficient memories of the smart terminals, so it is necessary to synthesize desired videos photographed and existing videos desired to be saved in order to save memories of smart terminals.

In the prior art, a video encoder is used to synthesize a photographed video and an existing video that is expected to be saved. Usually, a compression algorithm adopted by the video encoder has a high compression ratio. However, under the condition of ensuring a certain size of the target synthesized video data, the high compression ratio will lead to more loss of video and lower definition of video.

SUMMARY OF THE INVENTION

For this reason, it is necessary to provide a video synthesis method, apparatus, computer device, and computer-readable storage medium with respect to the technical problems described above.

In a first aspect, an embodiment of the present disclosure provides a video synthesis method, including:
  acquiring a first video;
  capturing second video data photographed in real time;
  performing first encoding on the second video data to obtain an encoded video;
  synthesizing the first video and the encoded video to obtain synthesized video data; and
  performing second encoding on the synthesized video data to obtain a target video.

According to one embodiment of the present disclosure, the step of performing first encoding on the second video data to obtain an encoded video comprises: performing first encoding on the second video data by adopting a first encoding mode to obtain the encoded video; and the step of performing second encoding on the synthesized video data to obtain a target video includes: performing second encoding on the synthesized video data by adopting a second encoding mode to obtain the target video; wherein the first encoding mode is different from the second encoding mode.

In one embodiment, the code rate of the second encoding is less than that of the first encoding.

In one embodiment, the resolution of the second encoding is less than or equal to that the resolution of the first encoding.

In one embodiment, the step of performing first encoding on the second video data by adopting a first encoding mode to obtain an encoded video includes: encoding the second video data in real time by adopting a first entropy encoding mode to obtain the encoded video.

In one embodiment, the step of performing second encoding on the synthesized video data by adopting a second encoding mode to obtain the target video includes: encoding the synthesized video data in non-real time by adopting a second entropy encoding mode to obtain a target synthesized video.

In one embodiment, the duration of the second video is equal to that the duration of the first video.

In a second aspect, an embodiment of the present disclosure provides a video synthesis apparatus, including:
  an acquisition module configured to acquire a first video;
  a capturing module configured to capture second video data photographed in real time;
  a first encoding module configured to perform first encoding on the second video data to obtain an encoded video;
  a video synthesis module configured to synthesize the first video and the second video to obtain synthesized video data; and
  a second encoding module configured to perform second encoding on the synthesized video data to obtain a target video.

In a third aspect, an embodiment of the present disclosure provides a computer device, including a memory and a processor, wherein the memory stores a computer program that is configured when executed by the processor to implement the steps of the method in the first aspect, including:
  acquiring a first video;
  capturing second video data photographed in real time;
  performing first encoding on the second video data to obtain an encoded video;
  synthesizing the first video and the encoded video to obtain synthesized video data; and
  performing second encoding on the synthesized video data to obtain a target video.

In a fourth aspect, an embodiment of the present disclosure provides a computer-readable storage medium wherein the computer-readable storage medium has a computer program storage thereon and is configured to implement, when executed by a processor, the steps of the method in the first aspect, including:
  acquiring a first video;
  capturing second video data photographed in real time;
  performing first encoding on the second video data to obtain an encoded video;
  synthesizing the first video and the encoded video to obtain synthesized video data; and
  performing second encoding on the synthesized video data to obtain a target video.

The video data synthesis method, apparatus, computer device and computer-readable storage medium provided in these embodiments may result less loss in target video frames and relatively high definition of video frames.

THE DESCRIPTION OF DRAWINGS

DETAILED DESCRIPTION OF THE PREFERRED EMBODIMENT

In order to make the purposes, technical solutions and advantages of the embodiments of the present disclosure clearer, the technical solutions in embodiments of the present disclosure will be described clearly and completely with reference to the drawings for the embodiments of the present disclosure. Obviously, the described embodiments are part of possible embodiments of the present disclosure, not all of them. Based on the embodiments in the present disclosure, all other embodiments obtained by those skilled in the art without creative labor fall in the protection scope of the present disclosure.

Figure 1:
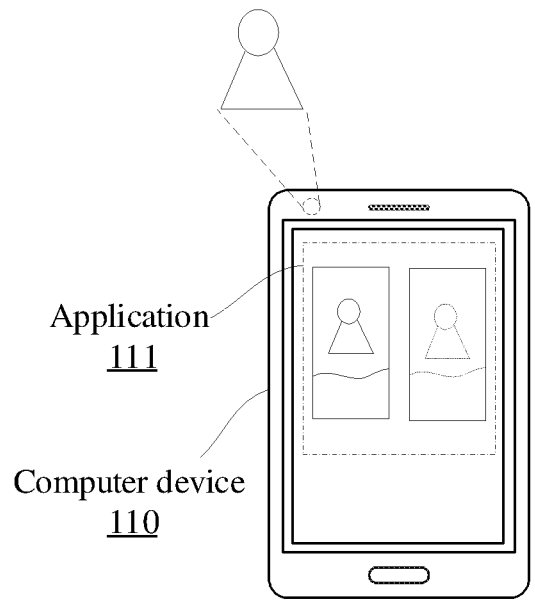
FIG. 1 is a view illustrating an application scenario of a video synthesis system according to an embodiment of the present disclosure.

The video synthesis method provided in the embodiment of the present disclosure may be applied to the application scenario of the video synthesis system as shown in FIG. 1. The computer device 110 can be an electronic device with video image acquisition and processing functions, such as a smart phone, a tablet, a laptop, a desktop computer or a personal digital assistant, and the present embodiment does not limit the specific form of the computer device 110. It should be noted that the computer device 110 can support the running of various applications, such as the application 111. Optionally, the application 111 can obtain video materials of the video to be synthesized through an image acquisition apparatus of the computer device 110, synthesize the video data materials to obtain a corresponding video, and output the obtained video through an interface of the application 111. Optionally, the application 111 may be a material (e.g., video and image) processing application, or a browser application. In embodiments of the present disclosure, the specific form of the application 111 is not limited.

It should be noted that the main body of the video synthesis method provided by embodiments of the present disclosure can be a video synthesis apparatus, which can be implemented as a part or all of computer device by means of software, hardware or a combination of software and hardware.

In order to make the purposes, technical solutions and advantages of the present disclosure clearer, the technical solutions in the embodiments of the present disclosure will be further explained in detail through the following embodiments in conjunction with the drawings. It should be understood that the specific embodiments described herein are only used to explain the disclosure, and are not used to limit the present disclosure.

Figure 2:
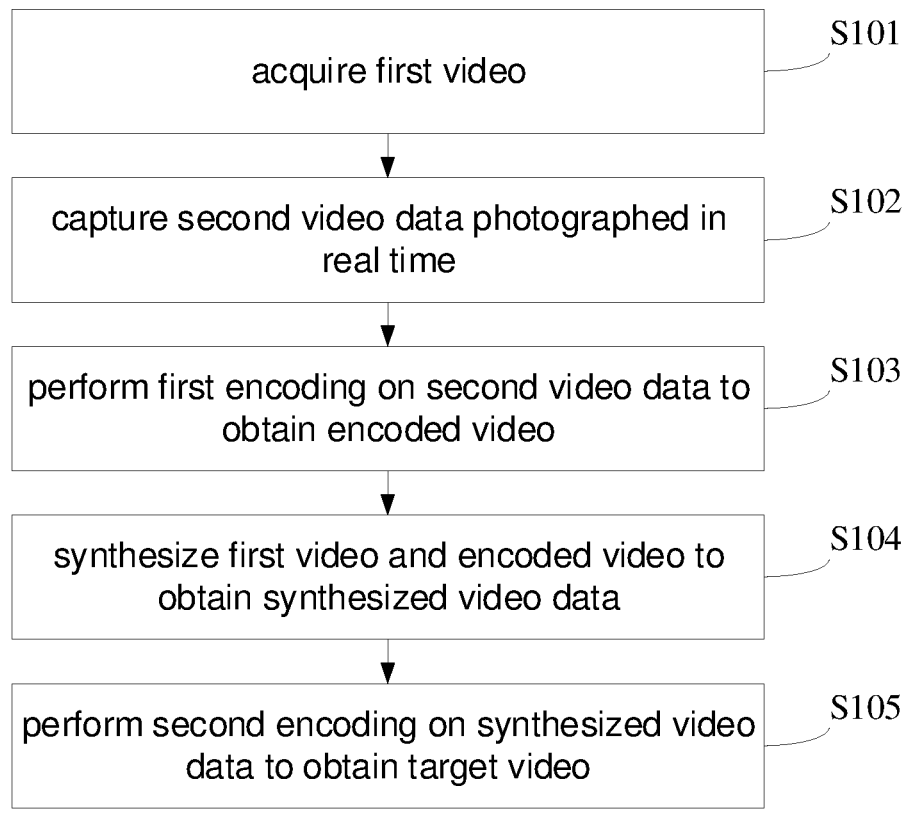
FIG. 2 is a flowchart illustrating a video synthesis method according to an embodiment of the present disclosure.

FIG. 2 is a flowchart illustrating a video synthesis method according to an embodiment of the present disclosure. The embodiment of the present disclosure relates to a specific process in which the computer device encodes the first synthesized video data to obtain the second synthesized video. As shown in FIG. 2, the video synthesis method includes:

S101: acquiring a first video.

In an embodiment of the present disclosure, the first video may be a video stored locally by a computer device, which photographs or downloads a saved local video in advance by the computer device, or a video stored in cloud, which is not limited in the embodiment of the present disclosure.

It should be noted that the computer device can acquire the first video according to a received click instruction, and the acquired first video can be any local videos, which is not limited in this embodiment.

S102. capturing second video data photographed in real time.

Figure 3:
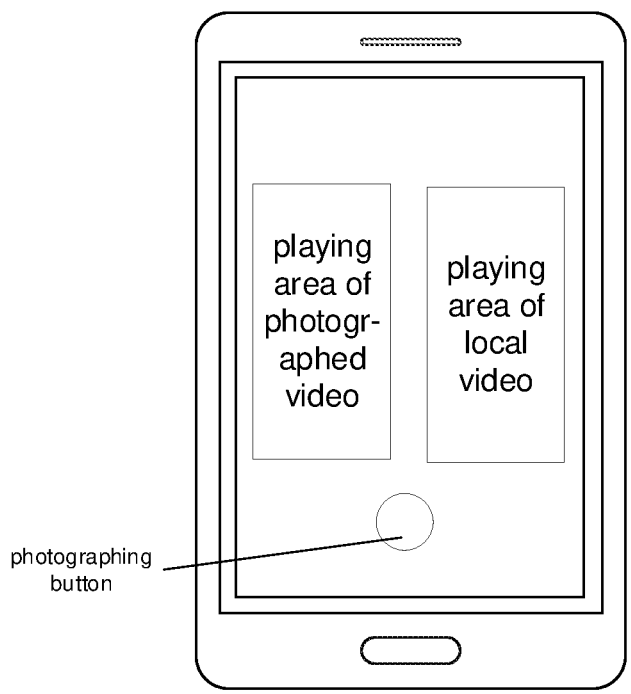
FIG. 3 is a schematic diagram illustrating a user interface of an application program according to an embodiment of the present disclosure.

In an embodiment of the present disclosure, the computer device can photograph the second video data in real time according to a received photographing command. Optionally, the above photographing command can be generated by a user pressing and holding a photographing button (such as a hardware key, virtual key or interactive interface) on the computer device. It should be noted that an interface after the computer device opens the application can be as shown in FIG. 3, and the application can be software with a split-screen function. As shown in FIG. 3, the locations of local video playing area and photographed video playing area are preset by the application.

For example, as shown in FIG. 3, the user opens the application program, clicks the local video playing area on the right side, and can select a locally saved first video. Then the user may press and hold the photographing button to capture photographed video in the left video playing area in real-time, and when the duration of photographing video is equal to a first video duration, the photographing will automatically end. Alternatively, when the duration of photographing video is less than the first video duration and the photographing button is released, the photographing for a first small video clip is finished, and the photograph for a second small video clip would be continued until the photographing button is pressed again, which the entire photograph would automatically end until the sum of durations of the last small video clip and all previous small video clips is equal to the duration of the first video.

Optionally, the duration of the second video is equal to that of the first video.

Optionally, in the process of photographing the second video, the user can press and hold the photographing button on the computer device once until the duration of the acquired second video is equal to the duration of the first video, which the photographing automatically ends. Alternatively, the user can also press and hold the photographing button on the computer device many times to obtain the second video data photographed in real time, wherein the sum of the duration of pressing and holding the photographing button is equal to the duration of the first video. For example, if the duration of the first video is 6 minutes and the user obtains the second video data photographed in real time by pressing and holding the photographing button three times, whereas the duration of pressing and holding the photographing button for the first time is 1 minute and the duration of pressing and holding the photographing button for the second time after the first photographing is 2 minutes, then the photographing would automatically end until the duration of pressing and holding the photographing button for the third time is 3 minutes. Optionally, the resolution and code rate of the second video data can be determined according to the initial values of the software corresponding to photographing the second video data on the computer device, and after the software for photographing the second video data is determined, the resolution and code rate of the second video data may be determined accordingly.

S103: performing first encoding on the second video data to obtain an encoded video.

Specifically, in the process of photographing the second video data in real time, the computer device performs first encoding on the second video data photographed in real time to obtain an encoded video.

It should be noted that the above-mentioned first encoding can be characterized as a specific compression technology, which is a way of converting a file in one video format into another video format.

S104: synthesizing the first video and the encoded video to obtain synthesized video data.

It should be noted that after the encoded video is obtained, the computer device can automatically synthesize (e.g. collage) the first video and the encoded video (e.g., producing a collage video from the first video and the encoded video). In the process of generating the synthesized video data, the computer device can display the words "loading data" on the interface of the application and display a loading progress, which can be characterized as the percentage of synthesizing video data.

S105: performing second encoding on the synthesized video data to obtain a target video.

In an embodiment of the present disclosure, the computer device can perform second encoding on the synthesized video data to obtain a target video. It should be noted that the duration of the target video may be equal to the duration of the synthesized video. Optionally, the above second encoding can be characterized as a specific compression technology, which is a way of converting a file in a certain video format into a file in another video format. Optionally, the resolution and code rate of the target video can be customized according to user requirements.

It should be noted that, after obtaining the synthesized video data, the computer device can automatically perform second encoding on the synthesized video data. In this case, after the second encoding, the computer device can play the encoded target video.

According to the video synthesis method provided in the embodiment, a computer device obtains a video with less loss in target video frames and relatively high definition of video frames.

Figure 4:
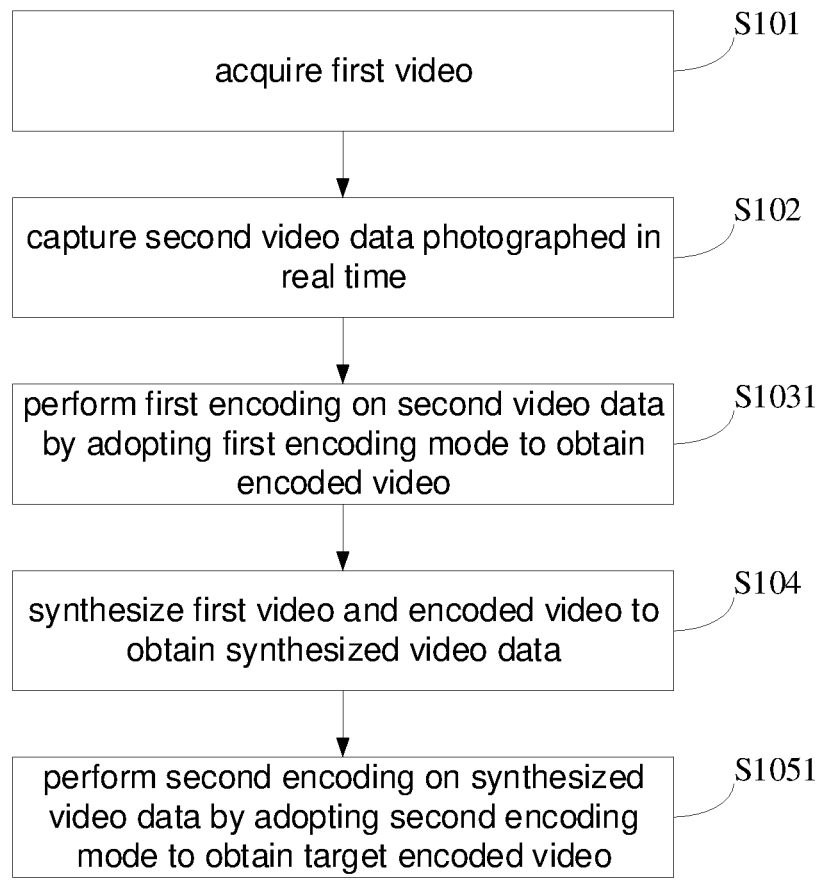
FIG. 4 is a flowchart illustrating a video synthesis method according to another embodiment of the present disclosure.

FIG. 4 is a flowchart illustrating a video synthesis method provided by another embodiment, and the video synthesis method specifically includes the following steps: steps S101, S102, S1031, S104 and S1051, wherein steps S101, S102 and S104 are the same as the above, which will not be described herein again.

S1031: performing first encoding on the second video data by adopting a first encoding mode to obtain the encoded video.

Specifically, in the process of photographing the second video data in real time, the computer device can adopt the first encoding mode to perform first lossy encoding on the second video data photographed in real time to obtain the encoded video.

It should be noted that the definition of the edited video obtained by the first encoding can be consistent with the definition of the second video photographed in real time.

S1051: performing second encoding on the synthesized video data by adopting a second encoding mode to obtain the target encoded video.

Wherein the first encoding mode is different from the second encoding mode.

Optionally, the code rate of the second encoding is less than that of the first encoding, and the resolution of the second encoding is less than or equal to that of the first encoding.

In an embodiment of the present disclosure, the computer device can perform secondary lossy encoding on the synthesized video data by adopting a second encoding mode to obtain the target video, and the code rate of the second encoding is less than that of the first encoding, and the resolution of the second encoding is less than or equal to that of the first encoding.

According to an embodiment of the present disclosure, the resolution and code rate of the second encoding are equal to those of the target video respectively.

Through the video synthesis method provided in the embodiment, computer device can adopt the first encoding mode to perform first lossy encoding on the second video data, which may make the resolution of the encoded video equal to that of the second video photographed in real time as much as possible through the first encoding, and adopt the second encoding mode to perform second encoding on the encoded video obtained after the first encoding to obtain the target encoded video, wherein the code rate of the second encoding is less than that of the first encoding, and the resolution of the second encoding is less than or equal to the resolution of the first encoding. This method can prevent loss of the target encoded video frames and ensure high definition of the target encoded video frames in a case that the obtained target encoded video file is small.

In one of the embodiments, the step of performing first encoding on the second video data by adopting a first encoding mode to obtain an encoded video includes: encoding the second video data in real time by adopting a first entropy encoding mode to obtain the encoded video.

In an embodiment of the present disclosure, the computer device can encode the second video data photographed in real time by adopting the first entropy encoding mode to obtain the encoded video. Optionally, the above entropy encoding mode can be characterized as encoding without losing any information according to entropy principle. Optionally, the first entropy encoding mode can be Shannon encoding, Huffman encoding, arithmetic encoding, Columbus encoding, etc., which is not limited in the embodiment.

It should be noted that the above-mentioned real-time encoding can be characterized by the fact that the total number of frames of coded video is unchanged and the encoding speed is fixed.

According to the video synthesis method provided in the embodiment, the computer device can encode the second video data in real time by adopting the first entropy encoding mode, so as to prevent loss of video frames and ensure that the obtained coded video has high definition, when the encoding rate is large.

In the embodiment of present disclosure, the step of performing second encoding on the synthesized video data by adopting a second encoding mode to obtain the target video incudes: encoding the synthesized video data in non-real time by adopting a second entropy encoding mode to obtain the target video.

In an embodiment of the present disclosure, the computer device can encode the synthesized video data obtained by the first encoding in non-real time by adopting the second entropy encoding mode to obtain the target video. Optionally, the second entropy encoding mode can be Shannon encoding, Huffman encoding, arithmetic encoding, Columbus encoding, etc., which is not limited in this embodiment. Optionally, the above-mentioned non-real-time encoding can be characterized by the fact that the total number of frames of encoded video is unchanged, the encoding speed is not limited, and only the total duration of encoded video data needs to be considered. In addition, the encoding speed of non-real-time encoding may be lower than that of real-time encoding.

In the video synthesis method provided in the embodiment, the computer device can encode the synthesized video data in non-real time by using the second entropy encoding mode, thereby ensuring less loss of frames and high definition of an obtained target video when the video encoding rate is small.

It should be understood that although the steps in the flowcharts of FIGS. 2 to 4 are displayed in sequence as indicated by arrows, these steps are not necessarily executed in sequence as indicated by arrows. Unless explicitly stated herein, the execution of these steps is not strictly limited in order, and these steps can be executed in other orders. Furthermore, at least some of the steps in FIGS. 2 to 4 may include a plurality of sub-steps or stages, which may not necessarily be completed at the same time, but may be executed at different times, and the execution sequence of these sub-steps or stages may not necessarily be carried out sequentially, but may be executed alternately or alternatively with other steps or at least a part of sub-steps or stages of other steps.

For the specific description of the video synthesis apparatus, please refer to the description of the video synthesis method above, and it will not be described in detail here. Each module in the video synthesis apparatus of the above-mentioned computer device can be realized in whole or in part by software, hardware and their combination. The above modules can be embedded in or independent of the processor in the computer device in hardware form, and can also be stored in the memory in the computer device in software form, so that the processor can call and execute the operations corresponding to the above modules.

Figure 5:
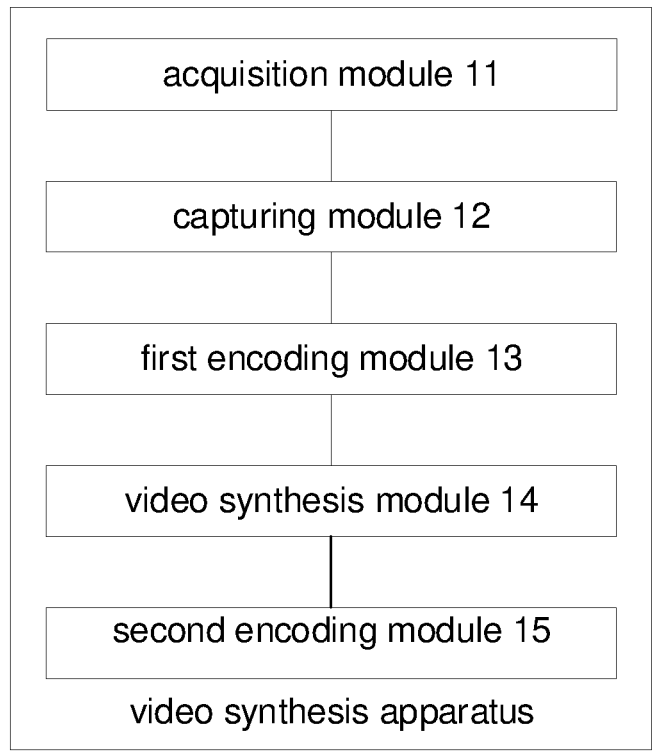
FIG. 5 is a schematic structural diagram illustrating a video synthesis apparatus according to an embodiment of the present disclosure.

FIG. 5 is a structural diagram illustrating a video synthesis apparatus according to an embodiment. As shown in FIG. 5, the device may include an acquisition module 11, a capturing module 12, a first encoding module 13, a video synthesis module 14 and a second encoding module 15.

In an embodiment of the present disclosure, the acquisition module 11 may obtain a first video;

the capturing module 12 may capture second video data photographed in real time;

the first encoding module 13 may perform first encoding on the second video data to obtain an encoded video;

the video synthesis module 14 may synthesize the first video and the encoded video to obtain synthesized video data;

the second encoding module 15 may perform second encoding on the synthesized video data to obtain a target video.

Optionally, the duration of the second video is equal to that of the first video.

The video synthesis apparatus provided in this embodiment can execute the above method embodiments, and its implementation principle and technical effect are similar, which would not be repeated herein.

Another embodiment of the present disclosure provides a video synthesis apparatus. Unlike the video synthesis apparatus shown in FIG. 5, the first encoding mode 13 may perform first encoding on the second video data by adopting a first encoding mode to obtain an encoded video; the second encoding module 15 may perform second encoding on the synthesized video data by adopting a second encoding mode to obtain the target video. Wherein the code rate of the second encoding is less than that of the first encoding. Optionally, the resolution of the second encoding is less than or equal to the resolution of the first encoding.

The video synthesis apparatus provided in this embodiment can execute the above method embodiments, and its implementation principle and technical effect are similar, which would not be repeated herein.

Further referring to FIG. 5, on the basis of the embodiment shown in FIG. 5, the first encoding module 13 may further encode the second video data in real time by adopting a first entropy encoding mode to obtain the synthesized video data.

The video synthesis apparatus provided in this embodiment can execute the above method embodiment, and its implementation principle and technical effect are similar, which would not be repeated herein.

In an embodiment of the present disclosure, the second encoding module 15 may perform non-real-time encoding on the synthesized video data by using the second entropy encoding mode to obtain the target video.

The video synthesis apparatus provided in this embodiment can execute the above method embodiment, and its implementation principle and technical effect are similar, which would not be repeated herein.

Figure 6:
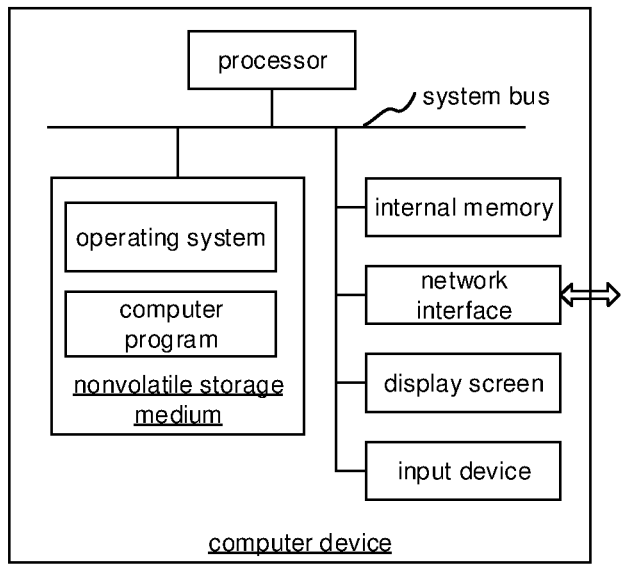
FIG. 6 is a schematic structural diagram illustrating a computer device according to an embodiment of the present disclosure.

In one embodiment, a computer device is provided, and its internal structure diagram can be shown in FIG. 6. The computer device includes a processor, a memory, a network interface, a display screen and an input device which are connected through a system bus. Wherein the processor of the computer device is used for providing computing and control capabilities. The memory of the computer device includes a nonvolatile storage medium and an internal memory. The nonvolatile storage medium stores an operating system and computer programs. The internal memory provides an environment for the operation of the operating system and computer programs in the nonvolatile storage medium. The network interface of the computer device is used to communicate with external terminals through network connection. The computer program is executed by a processor to realize a video synthesis method of the present disclosure. The display screen of the computer device can be a liquid crystal display screen or an electronic ink display screen, and the input device of the computer device can be a touch layer covered on the display screen, a key, a trackball or a touch pad arranged on the shell of the computer device, or an external keyboard, touch pad or mouse.

It can be understood by those skilled in the art that the structure shown in FIG. 6 is only a block diagram of some structures related to the scheme of the present disclosure, and does not constitute a limitation on the computer device to which the solution of the present disclosure applies. The specific computer device may include more or fewer components than those shown in the figure, or combine some components, or have different component arrangements.

In an embodiment of the present disclosure, a computer device is provided, which includes a memory and a processor, wherein a computer program is stored in the memory, and the processor implements the following steps when executing the computer program:

acquiring a first video;

capturing second video data photographed in real time;

performing first encoding on the second video data to obtain a compilation video;

synthesizing the first video and the encoded video to obtain synthesized video data; and performing second encoding on the synthesized video data to obtain a target video.

In one embodiment, a computer-readable storage medium is provided, on which a computer program is stored, and the computer program is executed by a processor to implement the following steps:

acquiring a first video;

capturing second video data photographed in real time;

performing first encoding on the second video data to obtain an encoded video;

synthesizing the first video and the encoded video to obtain synthesized video data; and performing second encoding on the synthesized video data to obtain a target video.

Those skilled in the art can understand that all or part of the flow of the method for realizing the above embodiments can be completed by instructing related hardware through a computer program, which can be stored in a nonvolatile computer-readable storage medium, and the computer program, when being executed, can include the flow of the above embodiments. Wherein, any reference to memory, storage, database or other media used in the embodiments provided by the present disclosure may include nonvolatile and/or volatile memory. The nonvolatile memory may include read-only memory (ROM), programmable ROM (PROM), electrically programmable ROM (EPROM), electrically erasable programmable ROM (EEPROM) or flash memory. The volatile memory may include random access memory (RAM) or external cache memory. By way of illustration rather than limitation, RAM is available in various forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), direct bus-type (Rambus) RAM (DRRAM), direct bus-type dynamic RAM (DRDRAM) memory, and bus dynamic RAM (RDRAM) memory.

The above-mentioned embodiments only express several embodiments of the disclosure, and their descriptions are specific and detailed, but they cannot be understood as limiting the scope of the patent of the disclosure. It should be pointed out that for those skilled in the art, without departing from the concept of the present disclosure, several modifications and improvements can be made, which belong to the protection scope of the present disclosure. Therefore, the scope of protection of the disclosed patent shall be subject to the appended claims.

What is claimed is:

1. A video synthesis method, comprising:

acquiring a first video;

capturing second video data photographed in real time;

performing first encoding on the second video data to obtain an encoded video, wherein the performing first encoding on the second video data to obtain an encoded video further comprises: encoding the second video data in real time by adopting a first entropy encoding mode to obtain the encoded video;

synthesizing the first video and the encoded video to obtain synthesized video data; and performing second encoding on the synthesized video data to obtain a target video, wherein the performing second encoding on the synthesized video data to obtain a target video further comprises: encoding the synthesized video data in non-real time by adopting a second entropy encoding mode to obtain the target video, wherein the first entropy encoding mode is different from the second entropy encoding mode, wherein, an encoding speed of encoding the synthesized video data in non-real time is lower than an encoding speed of encoding the second video data in real time.

2. The method according to claim 1, wherein a code rate of the second encoding is less than a code rate of the first encoding.

3. The method according to claim 2, wherein a resolution of the second encoding is less than or equal to a resolution of the first encoding.

4. The method according to claim 1, wherein a duration of the second video is equal to a duration of the first video.

5. A computer device comprising:

a memory; and a processor, wherein the memory stores a computer program that, when executed by the processor, causes the computer device to perform operations of:

acquiring a first video;

capturing second video data photographed in real time;

performing first encoding on the second video data to obtain an encoded video, wherein the performing first encoding on the second video data to obtain an encoded video further comprises: encoding the second video data in real time by adopting a first entropy encoding mode to obtain the encoded video;

synthesizing the first video and the encoded video to obtain synthesized video data; and performing second encoding on the synthesized video data to obtain a target video, wherein the performing second encoding on the synthesized video data to obtain a target video further comprises: encoding the synthesized video data in non-real time by adopting a second entropy encoding mode to obtain the target video, wherein the first entropy encoding mode is different from the second entropy encoding mode, wherein, an encoding speed of encoding the synthesized video data in non-real time is lower than an encoding speed of encoding the second video data in real time.

6. A non-transitory computer-readable storage medium, wherein the computer-readable storage medium has a computer program storage thereon and is configured to implement, when executed by a processor, a video synthesis method, comprising:

acquiring a first video;

capturing second video data photographed in real time;

performing first encoding on the second video data to obtain an encoded video, wherein the performing first encoding on the second video data to obtain an encoded video further comprises: encoding the second video data in real time by adopting a first entropy encoding mode to obtain the encoded video;

synthesizing the first video and the encoded video to obtain synthesized video data; and performing second encoding on the synthesized video data to obtain a target video, wherein the performing second encoding on the synthesized video data to obtain a target video further comprises: encoding the synthesized video data in non-real time by adopting a second entropy encoding mode to obtain the target video, wherein the first entropy encoding mode is different from the second entropy encoding mode, wherein, an encoding speed of encoding the synthesized video data in non-real time is lower than an encoding speed of encoding the second video data in real time.

7. The computer device according 5, wherein a code rate of the second encoding is less than a code rate of the first encoding.

8. The computer device according to claim 5, wherein a resolution of the second encoding is less than or equal to a resolution of the first encoding.

9. The computer device according to claim 5, wherein a duration of the second video is equal to a duration of the first video.

10. The method according to claim 1, wherein, a definition of the encoded video obtained by the first encoding is consistent with a definition of the second video photographed in real time.

11. The computer device according to claim 5, wherein, a definition of the encoded video obtained by the first encoding is consistent with a definition of the second video photographed in real time.

* * * * *